United States Patent [19]

Paul

[11] 4,041,790

[45] Aug. 16, 1977

[54] ROLLER CHAIN CONNECTING LINK SPRING CLIP

[75] Inventor: William T. Paul, Holyoke, Mass.

[73] Assignee: Incom International Inc., Pittsburgh, Pa.

[21] Appl. No.: 559,497

[22] Filed: Mar. 18, 1975

[51] Int. Cl.² .................... F16G 13/06; F16G 15/00; F16G 15/08

[52] U.S. Cl. .......................... 74/258; 59/86

[58] Field of Search ..................... 74/254, 258; 59/85, 59/86; 85/8.8

[56] References Cited

U.S. PATENT DOCUMENTS

| 600,595 | 3/1898 | Pond | 74/258 |
|---|---|---|---|
| 847,235 | 3/1907 | Butler | 74/258 |
| 2,746,116 | 5/1956 | Craven | 74/254 |
| 2,775,156 | 12/1956 | Imse et al. | 74/254 |
| 3,877,688 | 4/1975 | McCarty | 74/258 |

FOREIGN PATENT DOCUMENTS

| 108,646 | 8/1917 | United Kingdom | 74/258 |

*Primary Examiner*—Samuel Scott
*Assistant Examiner*—Allan R. Burke
*Attorney, Agent, or Firm*—James C. Wray

[57] ABSTRACT

A spring clip is capable of selective installation on and removal from a pair of adjacent pins in a roller chain. The spring clip has a body portion formed of sheet spring metal and an opening at each of its opposite ends. The intermediate section of the body portion is preformed into an arc to establish a predetermined linear distance between the openings. The openings may only be simultaneously received by and installed at recesses at the extended ends of each pin by deforming the arc of the intermediate section to alter the distance between the openings to a magnitude generally corresponding to a predetermined distance between the pins. When both openings are simultaneously installed at the recessed portions of their respective pins, the arc of the intermediate section tends to re-establish the predetermined linear distance to prevent inadvertent removal of the spring clip from the pins.

8 Claims, 8 Drawing Figures

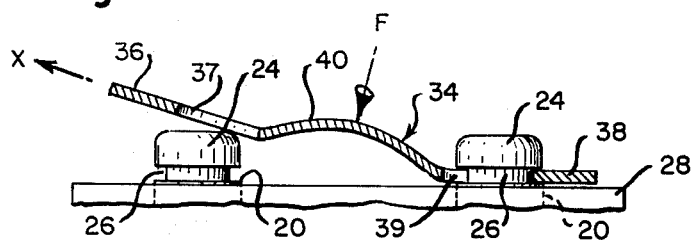
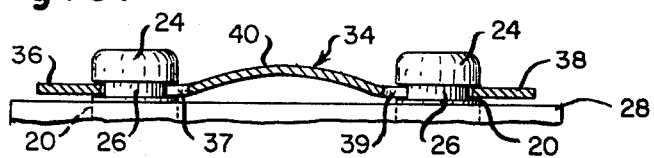
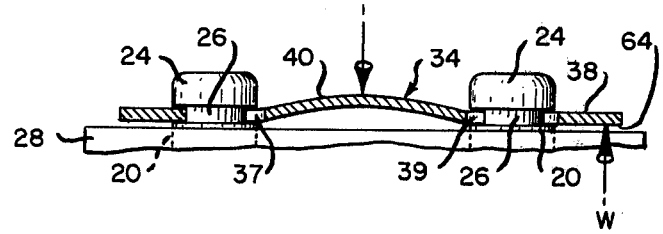
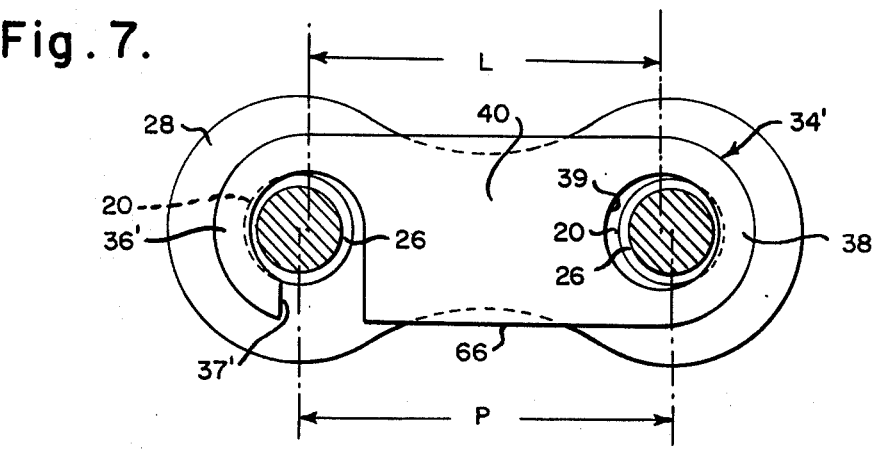
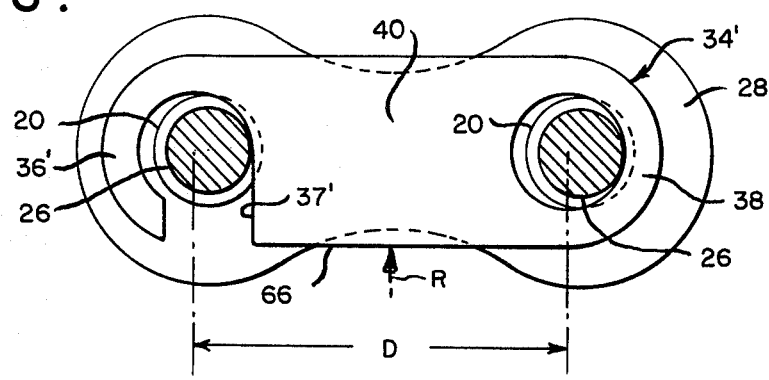

ROLLER CHAIN CONNECTING LINK SPRING CLIP

BACKGROUND OF THE INVENTION

1. Field of the Invention

This invention relates to a spring clip for selective installation on and removal from a pair of adjacent pins of a roller chain to join links thereof to make the chain endless.

2. Background of the Invention

It is quite common to have roller chains which are assembled with alternate inside and outside links. These roller chains include a series of connected journal bearings with the inside links containing a pair of bushings and the outside links having a pair of pins, respectively, extending through one bushing of each adjacent inside link. The bushing and thus the inside links are often retained on the pin by providing it with either a riveted or a cottered construction. Although it is often desirable to have an endless chain, at least one outside link is usually provided which may be selectively removed for ease of assembly. Although a simple cotter pin configuration might be utilized, a wide variety of spring clips have heretofore been provided for installation at the extended ends of the adjacent pins of the removable link to prevent its undesired removal when the endless chain is formed.

Some examples of spring clips previously employed may be found in British Pat. No. 27,253 and U.S. Pat. Nos. 602,633; 2,775,156; and 2,860,520. However, there are two spring clip designs which have most prevalently been utilized and which will be discussed in detail hereinbelow. These two prior art spring clips generally include an elongated loop-like spring metal member split at one end to allow the spaced legs to be sprung apart to accomplish engagement and disengagement of the adjacent pins of an outside link. It has heretofore been found that one of these spring clips is extremely difficult to install and the other has a tendency toward accidental disengagement during operation of the roller chain.

SUMMARY OF THE INVENTION

It is therefore an object of the invention to provide a spring clip capable of being installed on adjacent pins of a roller chain.

It is a further object to provide a spring clip of the type described which will not inadvertently disengage the adjacent pins during operation of the roller chain.

To accomplish these and other objects of the invention, a preferred embodiment thereof includes a spring clip which is capable of selective installation on and removal from a pair of adjacent pins of a roller chain which pins have a predetermined distance therebetween. Each pin has a recessed portion inwardly of an extended end. The spring clip includes a body portion formed of sheet spring metal and has first and second ends with an intermediate section therebetween. The first and second ends of the body portion respectively have first and second openings therethrough. The first opening is capable of being aligned for installation inwardly of the extended end and received at the recessed portion of a first of the adjacent pins. The second opening is capable of being aligned for installation inwardly of the extended end and received at the recess portion of a second of the adjacent pins. The intermediate section is preformed into an arc to provide a predetermined linear distance between the first and the second openings preventing the openings from being simultaneously aligned with and received at their respective adjacent pins. The first and second openings are only capable of simultaneous alignment with and receipt on the respective adjacent pins by deformation of the arc to provide a desired linear distance between the openings which is different from the predetermined linear distance and generally corresponds to the predetermined distance beween the adjacent pins. The arc of the intermediate section tends to re-establish the predetermined linear distance between the openings when the openings are simultaneously respectively received at the recessed portions of the adjacent pins to prevent inadvertent removal of the spring clip from the adjacent pins.

BRIEF DESCRIPTION OF THE DRAWINGS

FIG. 4 is a fragmentary side view, partly in section, of the preferred embodiment as generally aligned prior to installation.

FIG. 5 is a fragmentary side view, partly in section, of the preferred embodiment as installed.

FIG. 6 is a fragmentary side view, partly in section, of the preferred embodiment being removed from the pins.

FIG. 7 is a top plan view, partly in section, of an alternative embodiment of the invention as installed.

FIG. 8 is a top plan view, partly in section. of the alternative embodiment of FIG. 7 as it is being deformed for removal.

DETAILED DESCRIPTION OF THE PREFERRED EMBODIMENTS

Figure 1:
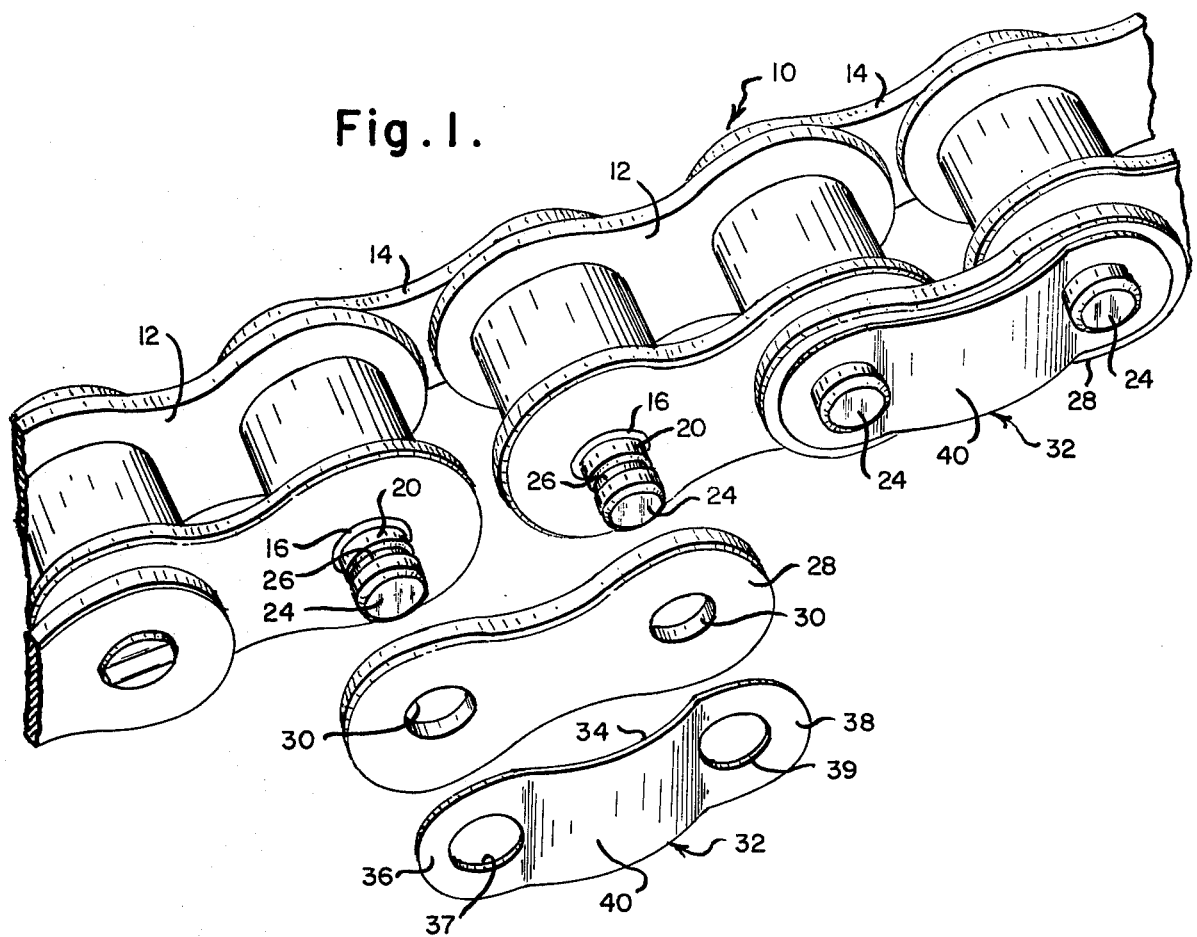
FIG. 1 is a perspective view of a portion of a roller chain including various features of the invention.

As shown in FIG. 1, a portion of a roller chain 10 includes alternate inside links 12 and outside links 14. Each inside link 12 includes a pair of bushings 16 with a roller 18 encircling each bushing 16. Each outside link 14 includes a pair of pins 20, each of which is adapted to be closely received within a bushing 16. By installing the pins 20 of an outside link 14, respectively, in adjacent bushings 16 of adjacent inside links 12, an endless chain may be formed.

As a practical matter, most roller chains are provided with a predetermined number of links which includes riveted or cottered pins so that only a limited number of outside links 14 may be selectively disassembled and reassembled to form the endless chain. The outside links 14 shown in FIG. 1 is of the type which may be disassembled and includes a pin link plate 22 from which each pin 20 extends. Each pin 20 includes a recessed portion 26 in the form of a circumferential groove inwardly of its extended end 24. A removable link plate 28 of the outside link 14 includes a pair of holes 30 aligned with and adapted to receive the pins 20 when the respective adjacent inside links 12 are installed thereon. The removable link plate 28 is axially positioned on the pins 20 inwardly of the recessed portions 26. It is the general purpose of this invention, and of the prior art spring clips to be installed on the pins 20 at the recessed portions 26 to retain removable link plate 28 which in turn insures that the inside links 12 are properly joined to form an endless chain.

The preferred spring clip 34 of the invention is made of sheet spring steel to include an elongated body portion 32 having a first end 36 and a second end 38 with an intermediate section 40 therebetween. The ends 36 and 38 are identical in this preferred embodiment, but are individually labeled to facilitate a detailed explanation of the operation of the spring clip 34 hereinbelow. It will be understood by the explanation that the ends 36 and 38 of the spring clip 34 are interchangeable so that either end may be first installed on, or removed from, its respective pin 20 without altering the retaining function of the clip 34.

Figure 2:
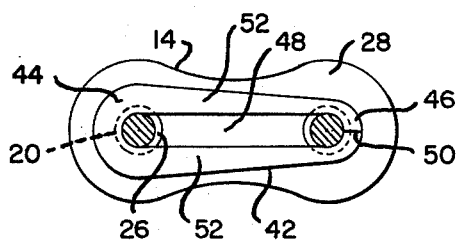
FIG. 2 is a top plan view, partly in section, of an installed prior art spring clip.

As shown in FIG. 2, a prior art spring clip 42 is installed at the recessed portions 26 of the pin 20 against a removable link plate 28. The extended ends 24 are omitted from the drawing to show the relationship of the clip 42 as it encircles the pins 20 at the recessed portions 26. However, the relative dimensions and location of the extended end 24 can be seen by the corresponding representation of the inward portion of the pin 20 as shown in FIG. 2.

The spring clip 42 is a flat elongated loop-like member of resilient metal having semicircular end portions 44 and 46. An elongated eye 48 of the spring clip 42 has a width substantially equal to the distance between the outside surfaces of the recessed portions 26. The end portion 46 is medially severed as at 50 so that the transversely spaced legs 52 of the clip 42 may be sprung laterally and outwardly or inwardly as may be desired for the spring clip 42 to be installed on, or removed from, the chain. Although the spring clip 42 adequately secures the removal link plate 28 to the outside link 14, the relationship with respect to the extended ends 24 of the pins 20 is such that the significant separation of the legs 52 makes installation of the spring clip 42 very difficult.

Figure 3:
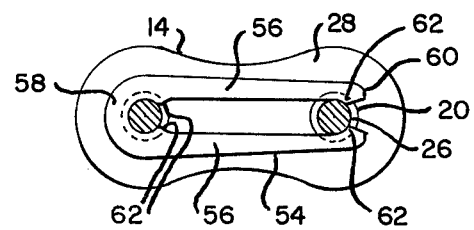
FIG. 3 is a top plan view, partly in section, of an installed, different prior art spring clip.

Another prior art spring clip 54 is shown in FIG. 3 and is again formed of resilient sheet metal. The spring clip 54 is a generally U-shaped member having a pair of legs 56 and a curved connecting portion at one end 58. The other end 60 includes an opening between the ends of the legs 56 which are tapered. During installation of the spring clip 54, it is slid into position at the recessed portions 26 from the left as shown in FIG. 3. The tapered portions of the end 60 allow the spring clip 54 to receive each pin 20 between the legs 56 as force is applied to move the clip to the right. The small tabs 62 on the inside surface of each leg 56 combine with the resilience of the spring clip 54 to generally retain both pins 20 after installation of the spring clip 54. The spring clip 54 should always be installed with the open end 60 trailing the direction of rotation. This direction of installation is intended to prevent a foreign object from making contact with the end 60 and thereby causing its inadvertent removal. It can be generally seen that the spring clip 54, although easier to install, is nevertheless more susceptible, even if properly installed, to inadvertent removal.

Returning to the preferred embodiment of the invention as shown in FIGS. 1, 4, 5 and 6, the spring clip 34 and the pins 20 include relative dimensional features which are very significant to an understanding of the operation and effectiveness of the spring clip 34. These dimensions, however, are best shown by reference to FIGS. 7 and 8 of an alternative embodiment of the preferred invention which nevertheless has these same dimensional characteristics. Specifically, the spring clip 34 is preformed with the intermediate portion 40 in the form of an arc so that there is a predetermined linear distance L between the openings 37 and 39. A predetermined distance P between the pins 20 is, as shown, greater than the predetermined linear distance L. When the spring clip 34 is deformed for installation or removal as will be explained in detail hereinbelow, a desired linear distance D between the openings 37 and 39 will be established. As shown in FIG. 4, for installation of the spring clip 34, the opening 39 is positioned over the extended end 24 of its respective post 20. The predetermined linear distance L of the spring clip 34 is such that the extended end 24 of the other pin 20 cannot be aligned with, or received in, the opening 37. However, by the application of force F to the intermediate section 40, the spring clip 34 will be slightly deformed to effectively shift the end 36 to the left as indicated by the arrow X. Sufficient force F will change the distance between the openings 37 and 39 from the predetermined linear distance L to the desired linear distance D allowing the extended end 24 to be received within the opening 37. After the extended end 24 is received within the opening 37, relaxation of force F causes the predetermined linear distance L between the openings 37 and 39 to be reassumed as shown in FIG. 5. Although there is some freedom of movement of the spring clip 34 on the pins 20, it can be seen that the openings 37 and 39 will be retained at the recessed portions 26 unless the intermediate section 40 is again deformed.

When removal of the spring clip 34 is desired, a force F' can be applied to the intermediate section 40 to straighten the arcuate shape in a manner similar to that which allowed the spring clip 34 to be initially installed. As shown in FIG. 6, the force F' causes the length between the openings 37 and 39 to approach the desired linear distance D. This allows the opening 39 to be aligned with the extended end 24 of its pin 20. With the force F' maintained thereon, the insertion of a knife edge at 64 allows a withdrawal force W to be applied to the end 38 of the spring clip 34 so that the opening 39 may be retracted about the extended end 24. When the end 38 is free of the pin 20 the entire spring clip 34 can be easily removed.

In actual operation, the force F and the force F' are easily provided by thumb pressure of the person installing or removing the spring clip 34. Although the withdrawal force W must overcome the force F', it has been found that a simple knife edge or screwdriver may be utilized effectively for removal of the spring clip 34.

An alternative spring clip 34' is shown in FIGS. 7 and 8 which has the same general dimensions as the spring clip 34 described hereinabove. However, the spring clip 34' includes an alternative opening 37'. The opening 37' extends outwardly to one side 66 of the spring clip 34' so that the end 36 ' only partially encircles the recessed portion 26 of its pin 20. As seen in FIG. 7, the end 36' effectively encircles the recessed portion 26 by the intermediate portion 40 again creating the predetermined linear distance L between the openings 37' and 39 to effectively secure the spring clip 34' as installed. However, as seen in FIG. 8, when a force is applied to deform the intermediate 40, as was explained hereinabove, so that the end 36' is shifted to the left, the desired predetermined distance D between the openings 37' and 39 is again established. Unlike the spring clip 34, however, since the opening 37' extends toward the side 66, the spring clip 34' may be removed by the additional application of a rotational force R. The rotational force R being applied to the spring clip 34' at the same time as the intermediate section 40 is deformed causes the spring clip 34' to rotate about its end 38 to release the end 36' from its pin 20. Once released, the entire spring clip 34' can be easily removed. It can now be seen that the spring clip 34' can be installed in a manner similar to that of spring clip 34 as shown in FIG. 4 or might alternately be installed by reversing the rotational movement as described hereinabove.

By the embodiments presented hereinabove, it should now be apparent that by preforming an intermediate section of a spring clip in accordance with the present invention, the length between the openings can be predetermined to insure that the spring clip is maintained on the adjacent pins at the recessed portions thereof. It should also be clear that with this basic concept in mind, the actual design of the intermediate section and the actual space between the openings might be changed while nevertheless falling within the scope of the invention as claimed. For example, the intermediate section might be in the form of a V so that force applied at the extended point would effectively alter the length between the openings. Similarly, a corrugated design could also be utilized. It would even be possible for the intermediate section to be preformed in such a manner that the length between the openings would be greater than the predetermined length between the pins. In this type configuration, deformation of the intermediate section would require the length between the openings to be shortened so that general retention at the inner sides of the recessed portions would be utilized when the spring clip returns to the longer distance between the openings. Further, although only one opening is altered in the alternate embodiment, it should be apparent that if the intermediate section were preformed so that the change in length between the openings from the deformation were greater, both openings might extend to the same or even opposite sides of the clip for full retention until the desired deformation is initiated. Finally, it should be clear to one of ordinary skill in the art that the cross-sectional dimensions of the pins and/or the openings might be altered or the location of the recessed portion might be limited to one side or the other of the pin without essentially altering the invention or its retention and removal features.

I claim:

1. A spring clip for selective installation on and removal from a pair of adjacent pins of a roller chain which said adjacent pins have a predetermined distance therebetween, each said pin having a recessed portion inwardly of an extended end, said spring clip comprising:

a body portion formed of sheet spring metal and having first and second ends and an intermediate section therebetween;

said first and said second ends of said body portion respectively having first and second openings therethrough;

said first opening being capable of being aligned for installation inwardly of said extended end and received at said recessed portion of a first of said adjacent pins;

said second opening being capable of being aligned for installation of said extended end and received at said recessed portion of a second of said adjacent pins;

at least said intermediate section of said body portion being preformed to a non-linear shape along the longitudinal axis of said body portion to provide a predetermined linear distance between said first and said second openings which said predetermined linear distance is different for said predetermined distance between said adjacent pins to prevent said openings from being simultaneously aligned with and received on their respective said adjacent pins;

said first and said second openings being capable of simultaneous said alignment with and receipt on said respective said adjacent pins by deformation of said non-linear shape of said intermediate section to provide a desired linear distance between said openings which is different from said predetermined linear distance and generally corresponds to said predetermined distance between said adjacent pins; and said non-linear shape of said intermediate section tending to re-establish said predetermined linear distance between said openings when said openings are simultaneously respectively received at said recessed portions of said adjacent pins to prevent inadvertent removal of said spring clip from said adjacent pins wherein said first end only partially encircles said first of said adjacent pins at said recessed portion by said first opening extending generally perpendicularly to one side of said body portion and said first opening allows said body portion to be rotated around said second end in a direction away from said one side when said non-linear shape of said intermediate portion is deformed to approach said desired linear distance between said openings.

2. A spring clip as set forth in claim 1, wherein said non-linear shape is in the form of an arc.

3. A spring clip as set forth in claim 2, wherein said intermediate section extends generally between said openings and said arc extends outwardly of said roller chain.

4. A spring clip as set forth in claim 2 wherein said predetermined linear distance is less than said predetermined distance and said deformation tends to flatten said arc and is caused by an application of force to said intermediate section in a direction toward said roller chain.

5. A spring clip as set forth in claim 1, wherein said extended ends have a generally circular cross-section, said openings are generally circular and slightly larger than said cross-section of said extended ends, and said recessed portion includes a circumferential groove around said pin.

6. The spring clip as set forth in claim 1, wherein the first and second ends are flat, and wherein the first and second openings are formed within the flat ends, whereby the entire openings are aligned with the recessed portions of the pins.

7. A spring clip as set forth in claim 6 wherein said intermediate section of said body is formed in an arc lying within the pin ends, which arc begins inwardly from the first and second openings.

8. A spring clip as set forth in claim 1 wherein the first opening has a circumference which extends arcuately for more than 180°.

* * * * *